(12) United States Patent
Daley

(10) Patent No.: US 8,913,254 B1
(45) Date of Patent: Dec. 16, 2014

(54) MEASURING DEVICE

(76) Inventor: Clifton George Daley, Toledo, OH (US)

(*) Notice: Subject to any disclaimer, the term of this patent is extended or adjusted under 35 U.S.C. 154(b) by 841 days.

(21) Appl. No.: 13/075,236

(22) Filed: Mar. 30, 2011

Related U.S. Application Data

(60) Provisional application No. 61/319,916, filed on Apr. 1, 2010.

(51) Int. Cl.
*G01B 11/06* (2006.01)
*G01B 11/02* (2006.01)

(52) U.S. Cl.
CPC ............... *G01B 11/06* (2013.01); *G01B 11/02* (2013.01); *G01B 11/022* (2013.01)
USPC ...... 356/632; 348/135; 250/559.27; 356/445; 356/503

(58) Field of Classification Search
CPC ... G01B 11/06; G01B 11/0675; G11B 7/1374
USPC ................. 356/364, 445, 630, 631, 632, 503; 348/135; 250/559.27
See application file for complete search history.

(56) References Cited

U.S. PATENT DOCUMENTS

| | | | | |
|---|---|---|---|---|
| 4,902,902 A | * | 2/1990 | Tole | 250/559.28 |
| 6,806,459 B1 | * | 10/2004 | Ringlien et al. | 250/223 B |
| 6,975,410 B1 | * | 12/2005 | Sturgill | 356/631 |
| 6,985,221 B2 | * | 1/2006 | Semersky et al. | 356/239.6 |
| 2003/0193672 A1 | * | 10/2003 | Okada et al. | 356/630 |
| 2007/0052978 A1 | * | 3/2007 | Pingel et al. | 356/632 |

* cited by examiner

*Primary Examiner* — Sath V Perungavoor
*Assistant Examiner* — Nathnael Aynalem
(74) *Attorney, Agent, or Firm* — Donald K. Wedding

(57) ABSTRACT

An optical wall-thickness measuring device for transparent articles. This invention may be practiced with any transparent material, amorphous or crystalline, which has two surfaces in close proximity to each other, and has flat or positively curved shape. As used herein, transparent means clear, translucent or partially transmitting such that a discernible image of the second surface reflection can be formed and detected at some wavelength of electromagnetic radiation.

6 Claims, 3 Drawing Sheets

MEASURING DEVICE

RELATED APPLICATION

This application claims priority under 35 U.S.C. 119(e) from Provisional Application Ser. No. 61/319,916 filed Apr. 1, 2010.

FIELD OF THE INVENTION

The present invention relates to an optical wall-thickness measuring device for transparent articles. This invention may be practiced with any transparent material, amorphous or crystalline, which has two surfaces in close proximity to each other, and has flat or positively curved shape. As used herein, transparent means clear, translucent or partially transmitting such that a discernible image of the second surface reflection can be formed and detected at some wavelength of electromagnetic radiation.

BACKGROUND OF THE INVENTION

For many transparent articles or objects such as float glass, windows, glass containers, and plastic or glass tubing, the parallelism, uniformity, or concentricity of the two surfaces cannot be well controlled for example because of viscosity variations in the plastic forming state. The undulations in the inner or outer surface can cause prism effects, which produce very significant errors in a thickness measurement based on the spatial separation of reflections from the inner and outer surfaces. In this case, if a small collimated light source such as a Laser beam is used for illumination, the inside surface reflected beam will not exit the outer surface parallel to the reflection from the outer surface. The spatial separation of the two reflections is then a function of the distance from the object to the measuring system and the surface wedge angle in the plane of the two light beams.

Collimated light is a beam of light for which the exiting rays are essentially parallel and does not appreciably change its cross-section area with increasing distance from the source. Non-collimated light may be converging or diverging, or a combination of both on different axes.

A problem with collimated or converging source illumination is that it requires exact object surface placement to keep both of the surface reflections within the field of view of the detector. A typical embodiment of the two surface reflection techniques is to set a collimated illumination source and the detector array very close to the article or object being measured. The close proximity of the detector to the article will reduce the offset of the two reflected beams at the detector caused by surface tilt or from internal surface undulations. However, using a short optical path length does not correct for the internal prism error. Also, a close spacing between the wall thickness measurement device and the article being inspected makes it very difficult to measure non-flat or non-circular articles or objects such as flask shaped containers.

Another problem with collimated point source illumination, such as a Laser beam, is that each measurement samples only a very small area of the article. A typical situation is provided by rotating a cylindrical article in a captive fixture, as taught by Juvinall et al., U.S. Pat. No. 5,291,271, which allows multiple point measurements to be taken over the entire circumference at one elevation. Measurements at one elevation may not be representative of thickness in the area, and a major thin or thick spot nearby could be missed if it occurs above or below the circumferential scan. The use of multiple scanning heads can provide additional measurements at different elevations, but the vast majority of the article surface is not inspected.

A solution to these problems is taught by Sturgill, U.S. Pat. No. 6,975,410, wherein two cameras and two lights are used to determine wall thickness, as shown in FIG. 1. Sturgill teaches a light at A, imaged by a camera at B, and a light at B, imaged by a camera at A. Since lights and cameras cannot physically co-exist, Sturgill teaches practical implementations using beam splitters, or alternatively slight displacement of the lights from their ideal positions. However, beam splitters introduce additional costs, and displacements of the lights introduce errors into the measurement.

SUMMARY OF THE INVENTION

In accordance with this invention, there is provided a non-contact method and apparatus to measure thickness readings for an article or object over a large area of the article being measured as it is moved or rotated relative to the measurement apparatus.

Also, there is provided a method and apparatus to simultaneously provide valid measurements for a sheet, plate, or three dimensional positively curved surface in areas of axially non-uniform surface profile such as conical tapers, axial curves and circumferential ribs.

The practice of this invention does not require precise placement of the article being measured with respect to the position of the measurement device.

This invention also allows the measurement of wall thickness for container type articles with noncircular cross section or non-cylindrical contour.

The practice of this invention provides a wall thickness measurement system, which optically corrects for prism effects caused by waves and undulations in front or back surface.

DETAILED DESCRIPTION OF THE DRAWINGS

Figure 1:
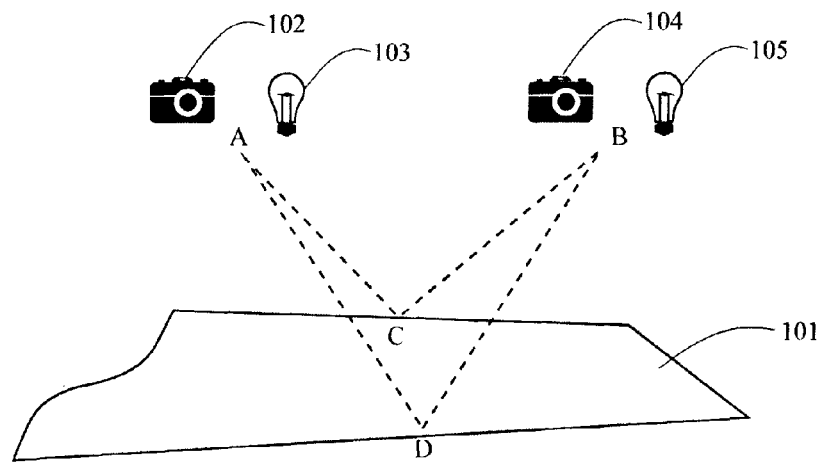
FIG. 1: illustrates two cameras, two light sources, and one reflecting object.
Figure 2:
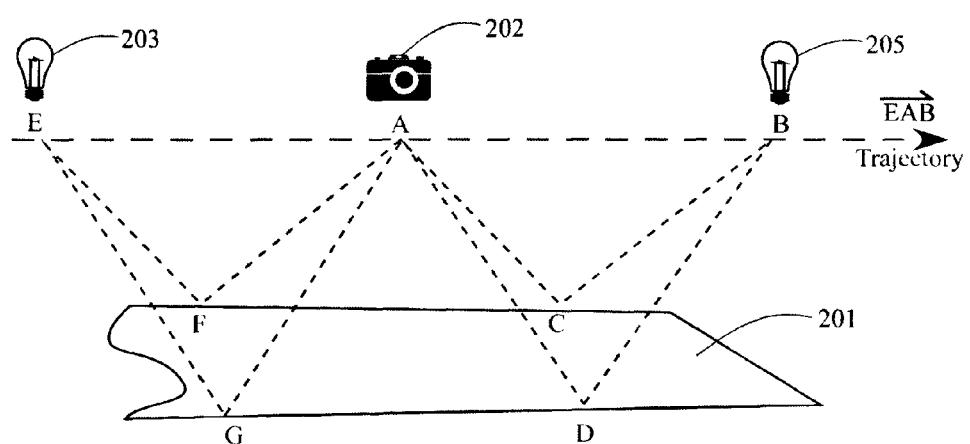
FIG. 2: illustrates one camera, two light sources, and a reflecting object with two reflecting surfaces.

FIG. 1 illustrates two cameras 102, 104, two light sources 103, 105, and one reflecting object 101. FIG. 2 illustrates two non-collimated and diverging sources of light, a first light 203 and a second light 205, each with a narrow elongated shape, and an imaging device 202, for example a digital camera, situated symmetrically between them. A diverging non-collimated light source is one for which the light rays are emitted in all directions spreading outward from the source. When the reflections of these lines are imaged coming from an article 201 such as a transparent flat plate or a transparent positively curved smooth sheet, with the major axis of the curved surface parallel to the axis of the line of light, four reflection lines are obtained. One pair of reflection lines will originate from the first light, corresponding to a first position F on the article. The other pair will originate from the second light and correspond to some other position C on the article. For each pair, the separation between the reflections is a function of the distance to the imaging device, the angle of incidence and reflection, the thickness distance between the two surfaces, the index of refraction of the transparent material and prism effects. The image is acquired and saved and forms the first image of a sequence of images. The apparatus is now traversed and/or rotated relative to the article such that each light and the imaging device follows an identical known trajectory, that is, the first light follows a path, the imaging device traces out the same path, but a specified distance behind, and the second light follows the imaging device but the same specified distance behind.

Figure 3:
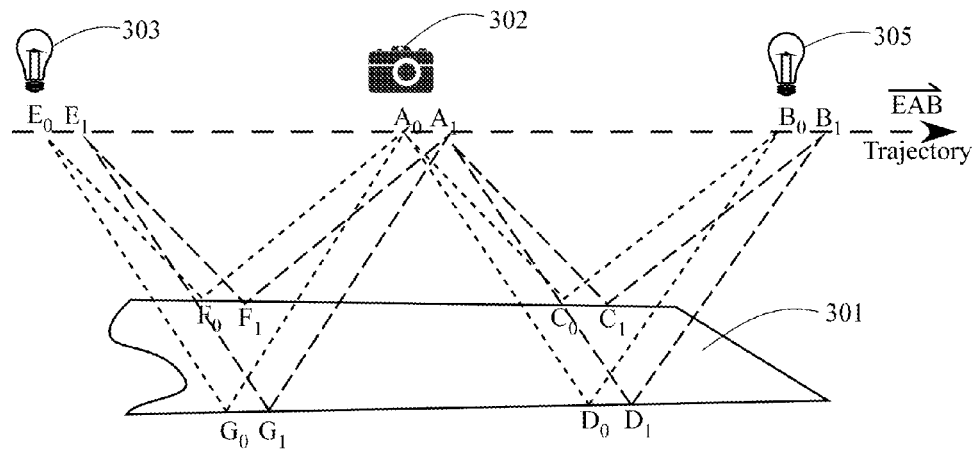
FIG. 3: illustrates one camera, two light sources, and a reflecting object with two reflecting surfaces, and two scans.

The images from the imaging device are acquired and stored periodically (FIG. 3). When the imaging device arrives at the position previously occupied by the first light, the second light will be in the position previously occupied by the imaging device. At that point the image acquired will comprise reflections from the second light, which will be equivalent to the reflections from the first light in the first image, but with the direction of light travel (and prism effect) reversed. By combining these four reflections the prism effect is removed and an accurate measurement of thickness is obtained at the first position. An example of this embodiment is shown in FIG. 2. The imaging device (camera) is at A, the first light is at B, the second light is at E and the first position is at C. The camera at A can determine vector AC. The camera and lights assembly is then translated and/or rotated relative to the object so that the camera is now at B and the light previously at E is now at A. The camera can now determine vector BC and triangulation can be used to determine the location of point C. All points C on the object can be determined in this way. Similarly all points D on the object can be determined, using the index of refraction of the object at determined points C.

Figure 4:
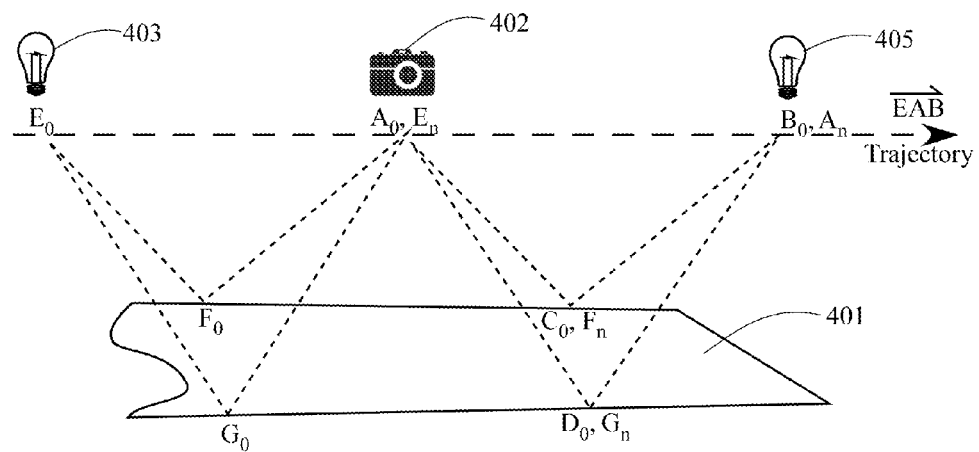
FIG. 4: illustrates one camera, two light sources, and a reflecting object with two reflecting surfaces, and two scans.

FIG. 4: illustrates one camera 402, two light sources 403, 405, and a reflecting object 401 with two reflecting surfaces, and two scans.

Figure 5:
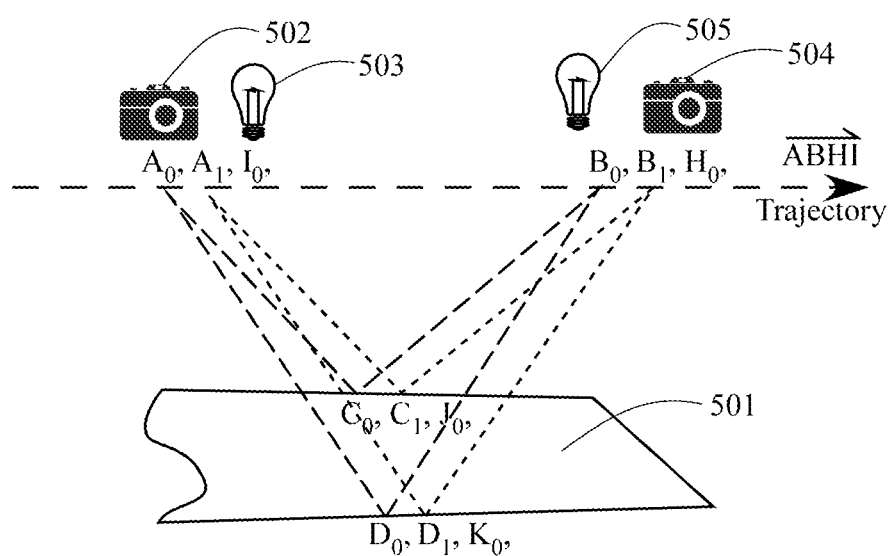
FIG. 5: illustrates two cameras, two light sources, and a reflecting object with two reflecting surfaces, and two scans.

In accordance with another embodiment of this invention, there are used two non-collimated light sources, a first light and a second light, each with a narrow elongated shape, and two imaging devices a first imaging device and a second imaging device, as shown in FIG. 5. The first light and the first imaging device are oriented towards the object such that the first and second surface reflections are in the field of view of the first imaging device. Similarly, the second light and the second imaging device are oriented towards the object such that the first and second surface reflections are in the field of view of the second imaging device. The first imaging device and the first light are moved along a known trajectory and images are acquired and stored periodically. The second imaging device and the second light are moved along the same trajectory, but with the imaging device and light reversed. That is, for some current scan, when the second imaging device is at a location previously occupied by the first light at a previous scan, the second light is at a position previously occupied by the first imaging device for that same previous scan. In the example shown in FIG. 5, at scan 0 the first imaging device (H) starts at position $H_0$, the first light (I) starts at position $I_0$, and the first imaging device acquires an image comprising first and second surface reflections from the object at $J_0$ and $K_0$ respectively. The second imaging device (A) starts at position $A_0$ and the second light (B) starts at position $B_0$. At a subsequent scan (scan 1), the second imaging device has moved to the position previously occupied by the first light at scan 0, and the second light has moved to the position previously occupied by the first imaging device. The reflections seen by the second imaging device at scan 1 are therefore from the same points on the object but in the opposite direction to the reflections seen by the first imaging device at scan 0. An accurate thickness measurement can therefore be made (the separation between $J_0$ and $K_0$ by correlating the scan 0 reflections of the first imaging device with the scan 1 reflections of the second imaging device.

SUMMARY

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. A method for measuring the wall thickness profile along a line on the surface of a transparent object comprising placing a first light source oriented towards the object, placing a second light source oriented towards the object, placing an imaging device symmetrically between the first and second light source and oriented to acquire an image comprising first and second reflections of the first and second light source respectively, moving the light sources and imaging device relative to the object such that the light sources and imaging device follow the same trajectory, acquiring and saving images during the movement, and determining the wall thickness profile by correlating first and second images, wherein the first image refers to an image taken before or during movement and the second image refers to an image taken at a subsequent time during movement when the imaging device is in the position of the first light at the time the first image was taken and the second light is in the position of the imaging device at the time the first image was taken.

2. The method of claim 1 wherein each of the first and second light sources is a non-collimated diverging light source.

3. The method of claim 2 wherein each of the first and second light sources has a narrow, elongated, emitting surface.

4. A method for measuring the wall thickness profile along a line on the surface of a transparent object comprising placing a first light source oriented towards the object, placing a first imaging device at a separate location from the first light source and oriented to acquire a first image comprising reflections of the first light source, acquiring and saving the first image from the first imaging device into a first image set, moving the first light source and the first imaging device along a known trajectory, acquiring and saving images from the first imaging device into the first image set during movement, subsequent to acquiring the first image:

placing a second light source at the location of the first imaging device when the first image was taken, placing a second imaging device at the location of the first light source when the first image was taken, and oriented to acquire a second image comprising reflections of the second light source, acquiring and saving the second image from the second imaging device into a second image set, moving the second light source and the second imaging device along the known trajectory, acquiring and saving images from the second imaging device into the second image set during movement, and determining the wall thickness profile by correlating the first and second images from the first and second image sets.

5. The method of claim 4 wherein each of the first and second light sources is a non-collimated diverging light source.

6. The method of claim 5 wherein each of the first and second light sources has a narrow, elongated, emitting surface.

\* \* \* \* \*